(12) United States Patent
Diem

(10) Patent No.: US 7,735,635 B2
(45) Date of Patent: Jun. 15, 2010

(54) DEVICE AND METHOD FOR STORING AND REMOVING WORK PIECES TO BE USED BY A SEPARATING DEVICE

(75) Inventor: Reinhard Diem, Wilhelmstr. 62, DE-71083 Herrenberg (DE)

(73) Assignee: Reinhard Diem, Herrenberg (DE)

( * ) Notice: Subject to any disclaimer, the term of this patent is extended or adjusted under 35 U.S.C. 154(b) by 140 days.

(21) Appl. No.: 11/817,046

(22) PCT Filed: Jan. 28, 2006

(86) PCT No.: PCT/EP2006/000757

§ 371 (c)(1),
(2), (4) Date: Aug. 24, 2007

(87) PCT Pub. No.: WO2006/092194

PCT Pub. Date: Sep. 8, 2006

(65) Prior Publication Data

US 2008/0190734 A1    Aug. 14, 2008

(30) Foreign Application Priority Data

Feb. 28, 2005   (EP)   ................................. 05004280

(51) Int. Cl.
B65G 21/14    (2006.01)
(52) U.S. Cl. .................................................... 198/812
(58) Field of Classification Search ................. 198/812, 198/343.1, 460.2, 577, 584, 586, 588, 594, 198/861.1
See application file for complete search history.

(56) References Cited

U.S. PATENT DOCUMENTS 3,127,978 A * 4/1964 Zuercher .................... 198/812
3,262,348 A    7/1966 Wiatt et al.
3,289,815 A * 12/1966 Richter et al. ............... 198/812
4,186,632 A * 2/1980 Leslie et al. .................... 83/13
4,681,501 A * 7/1987 Edwards et al. .......... 414/789.5
4,681,523 A * 7/1987 Thelen ........................ 425/168

(Continued)

FOREIGN PATENT DOCUMENTS

WO         03/016004       2/2003

OTHER PUBLICATIONS

International Search Report for corresponding Application No. PCT/EP2006/000757 mailed Apr. 18, 2006.

*Primary Examiner*—Gene Crawford
*Assistant Examiner*—William R Harp
(74) *Attorney, Agent, or Firm*—Renner, Otto, Boisselle & Sklar, LLP

(57) ABSTRACT

The invention relates to an arrangement and a method for the separation and removal of plate-shaped workpieces (7) out of the proximity of a separating device, which arrangement and method are intended for the automatic removal of such workpieces. For this purpose a bearing surface (2, 3) of a two-piece supporting table (4) is replaced by a second supporting table (6), which, together with the remaining bearing surface (3, 2), is moved and therein accepts the workpiece (7) completely. The second supporting table (6) subsequently carries the workpiece (7) completely out of the proximity of the first supporting table (4). The arrangement and the method permit separating the workpieces without damage to the support and the rapid and precise removal of the worked workpieces as well as of the trimmings.

9 Claims, 5 Drawing Sheets

U.S. PATENT DOCUMENTS

Figure 1:
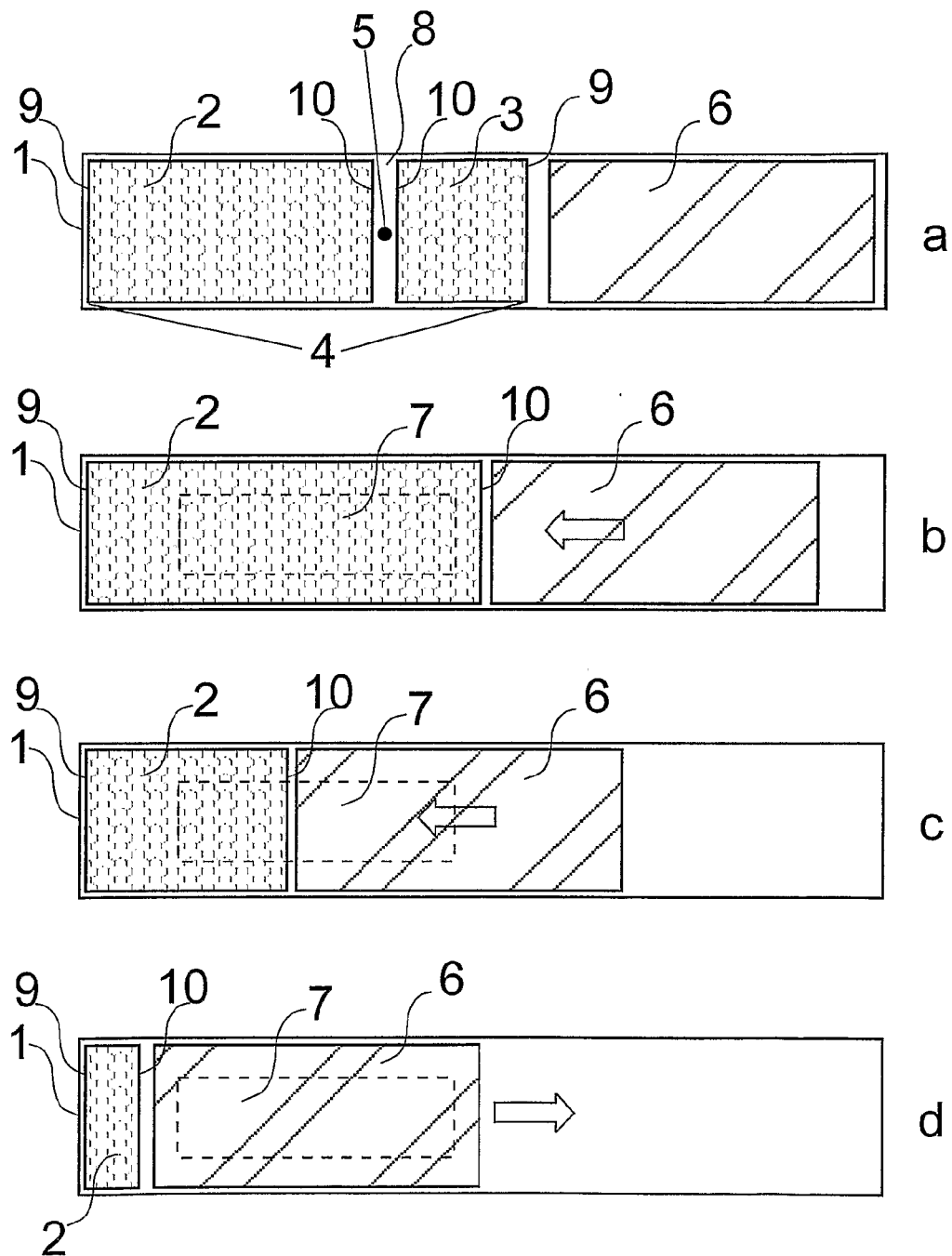

| | | | | |
|---|---|---|---|---|
| 4,728,379 A | * | 3/1988 | Audi et al. | 156/106 |
| 4,787,178 A | * | 11/1988 | Morgan et al. | 451/81 |
| 4,790,224 A | * | 12/1988 | Krutilla et al. | 83/53 |
| 5,046,603 A | * | 9/1991 | Odenthal | 198/812 |
| 5,642,803 A | * | 7/1997 | Tanaka | 198/535 |
| 6,607,082 B2 | * | 8/2003 | Biagioni et al. | 209/620 |
| 7,328,542 B2 | * | 2/2008 | Sandberg et al. | 53/122 |
| 7,395,918 B2 | * | 7/2008 | Thompson | 198/812 |
| 2008/0168876 A1 | * | 7/2008 | Kilian et al. | 83/424 |

* cited by examiner

DEVICE AND METHOD FOR STORING AND REMOVING WORK PIECES TO BE USED BY A SEPARATING DEVICE

FIELD

The invention relates to an arrangement for the positioning of plate-shaped workpieces in a separating device, which, during the separating process, is movable in the X/Y-directions, the X-advance direction being straight-ahead and the Y-advance direction being transversely thereto, with a first supporting table with a first bearing surface and a second bearing surface, the two bearing surfaces being spaced apart from one another and forming a gap disposed at least beneath the separating unit of the separating device and which gap is variable by increasing the one and decreasing the other bearing surface in the Y-direction, a link belt forming the bearing surface comprised of individual wire elements guided on the machine frame on their front ends, the link belt being secured at both ends on the machine frame and therewith forming the one end of the bearing surfaces, deflection devices for guiding the link belt with first deflection devices forming the other end of the particular receiving [sic] surface for forming the gap and second deflection devices beneath the bearing surfaces. The invention relates, in addition, to a method for positioning and removing plate-shaped workpieces, which workpieces are separated by means of a separating device, on a supporting arrangement, the supporting arrangement comprising a first bearing surface and a second bearing surface, which together form a first supporting table and which are spaced apart from one another and form a gap disposed at least beneath the separating unit and moved corresponding to the movement of the separating unit by increasing the one bearing surface and simultaneously decreasing the other bearing surface.

BACKGROUND

Such an arrangement is disclosed in U.S. Pat. No. 3,262,348. In this document a gap is moved beneath a cutting device in the above described manner, the bearing surface being formed of a flexible material, such as for example a multiplicity of material layers, on a belt forming the table top. The belt is guided about upper and lower deflection devices and is produced, for example, of leather, fabric, wire mesh, thin stainless steel or other flexible materials. Beneath the belt is located a multiplicity of support rods connected with one another with flexible cables and for the transport engage into corresponding recesses in the rollers of the deflection devices. The support rods are guided and held on both sides in the machine frame via an axial latching pin, guide runners entrained beneath the support rods ensuring the axial movement of the latching pins.

WO 03/016 004 A1 describes a similar device, wherein here, in addition to the movement of the gap during the separating process, the gap can also be enlarged in order to empty, for example, the cut-out parts into a container located beneath and therewith to make possible automatic operation.

For fast flow of the cutting process and also of the removal of the cut material, independently of whether or not the cut-out is removed downwardly as described in WO 03/016 004 A1, it is required to transport the material rapidly and simply out of the cutting region in order for new material to be emplaced for the cutting process.

BRIEF DESCRIPTION

The present invention therefore addresses the problem of proposing an arrangement and a method with which the positioning and at least the removal of the material becomes possible.

This problem is solved according to the invention through an arrangement with the characteristics of claim 1 as well as through a method according to the method claim. Further advantageous embodiments can be found in the particular back-referring dependent claims.

According to the invention the arrangement comprises a second supporting table, which table, instead of a bearing surface, is movable in the Y-direction together with the remaining other bearing surface and comprises an endless transport belt moved with deflection rollers in the manner of a crawler. This second supporting table is moved into the region of the first supporting table if the gap between the two bearing surface of the first supporting table has been moved so far to the lateral margin that now only one bearing surface is provided. The second supporting table can subsequently be moved together with the first supporting table in the Y direction. Thereby that the second supporting table comprises an endless transport belt moved in the form of a crawler with deflection rollers, the surface of the second supporting table moves to the degree beneath the materials as the remaining bearing surface of the first supporting table moves away in the downward direction. The material is thereby gradually accepted completely by the second supporting table.

In order for the second supporting table to assume the place of the one supporting belt [sic: bearing surface] of the first supporting table without a height offset being generated and for the free space released by the second bearing surface to be filled by the second supporting table, according to an advantageous embodiment the link belt is fixed on at least one transport chain which is secured at both ends on the machine frame. The transport chain is longer than the bearing surfaces formed with the bearing elements and projects at least at one end beyond a bearing surface so far that the bearing elements at this side are located beneath the supporting edge on the machine frame when the gap has arrived at its lateral end position and forms an available space at the level of the second work [sic] table.

In order for the bearing surfaces of the first supporting table to be supported such that they are sufficiently stable for the workpieces to be worked, the bearing elements rest in contact at their front ends on the machine frame over support elements movable in the longitudinal direction of the bearing elements. The support elements may either be extendable out of the bearing elements, as is the case in prior art, or they may be disposed on the machine frame. In case they are disposed on the machine frame, it is feasible to utilize L-shaped swivel elements fixed on one side, which can be swivelled under the bearing elements.

The second supporting table is advantageously movable into the proximity of the first supporting table, if the bearing elements of the no longer utilized bearing surface is located beneath the supporting plane on the machine frame.

For the purpose of transporting the second supporting table beneath the workpiece, the first deflection devices of the remaining bearing surface are purposefully connectable with the deflection rollers of the second work table. Therewith the endless transport belt turns at precisely the same speed and also does not require further additional driving means. It is understood, that it must be ensured that, for example via an intermediate roller, the rotational directions agree.

The second supporting table is preferably laterally guided on the machine frame such that thereby a free space in the machine frame is available in its full width for the second work table and its bearing surface.

After the separation of the second supporting table from the first deflection device, the second supporting table is purposefully, without turning of the endless transport belt, movable out of the machine frame in order for the workpiece located on it to be reliably transported away.

It is in principle also possible to provide a corresponding device which feeds a workpiece in the reverse manner. This could be accomplished with a third work table disposed on the opposing side of the first work table. However, as a rule, it is sufficient to provide the second work table only for transporting away the worked workpieces and the remaining wastage, since the deposition of a new workpiece can be completed faster and more precisely by handling units (robots).

According to the invented method, for fetching the finished workpiece the gap is moved to one end of the supporting arrangement such that only one bearing surface carries the workpiece. Instead of the other bearing surface, a second work table with the one bearing surface of the first work table is moved to the other end of the supporting arrangement, the remaining one bearing surface becoming smaller and therein transferring the workpiece completely to the second work table. The second work table with the workpiece is subsequently moved out of the proximity of the first supporting table.

With the arrangement and the method according to the invention it is consequently cost-effectively and rapidly possible, on the one hand, to cut optimally workpieces without damage to the bearing surfaces and, on the other hand, to remove the workpiece and also the trimmings fast and automatically.

LIST OF DRAWINGS

Figure 2:
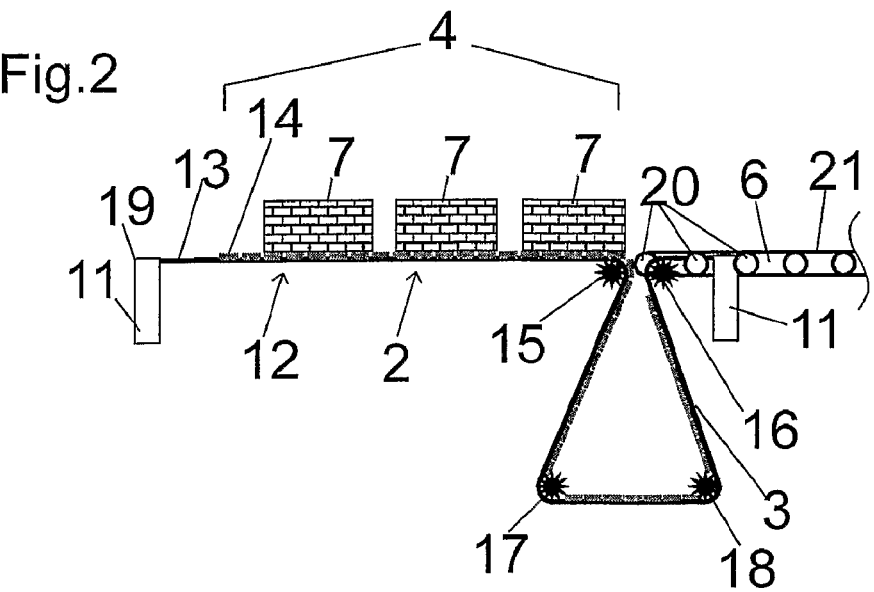
Figure 3:
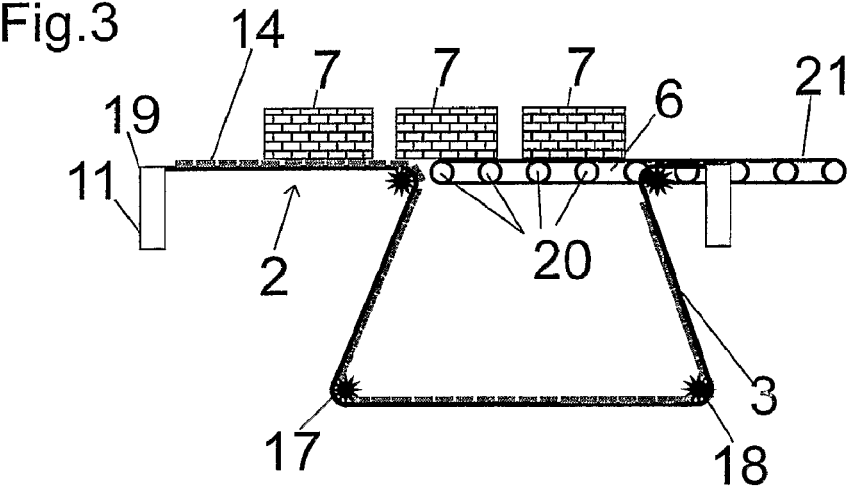
Figure 4:
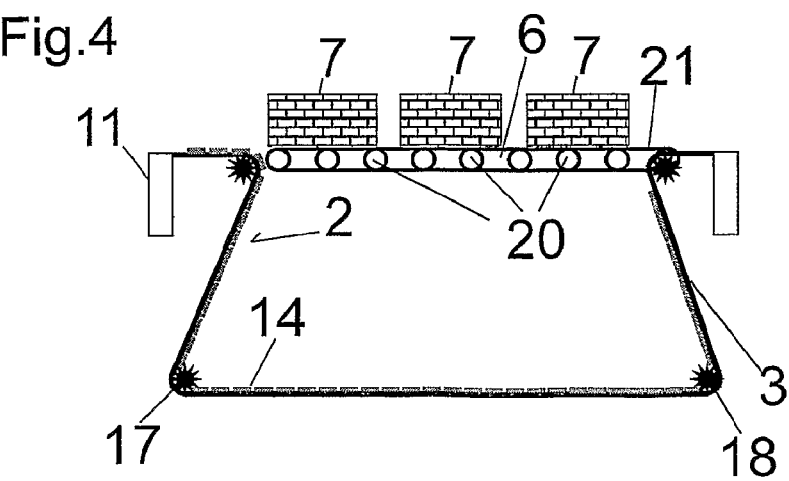
Figure 5:
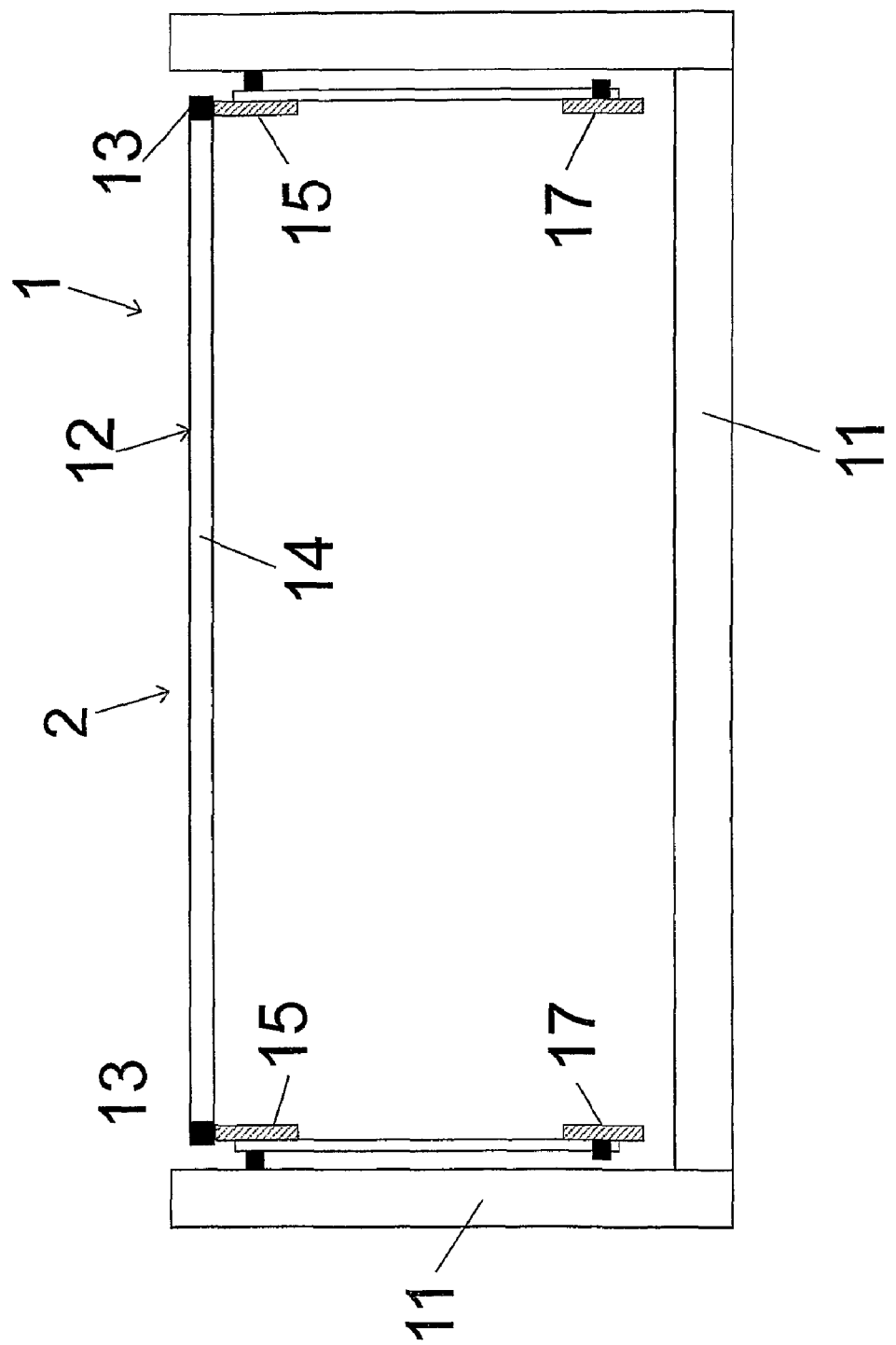
Figure 6:
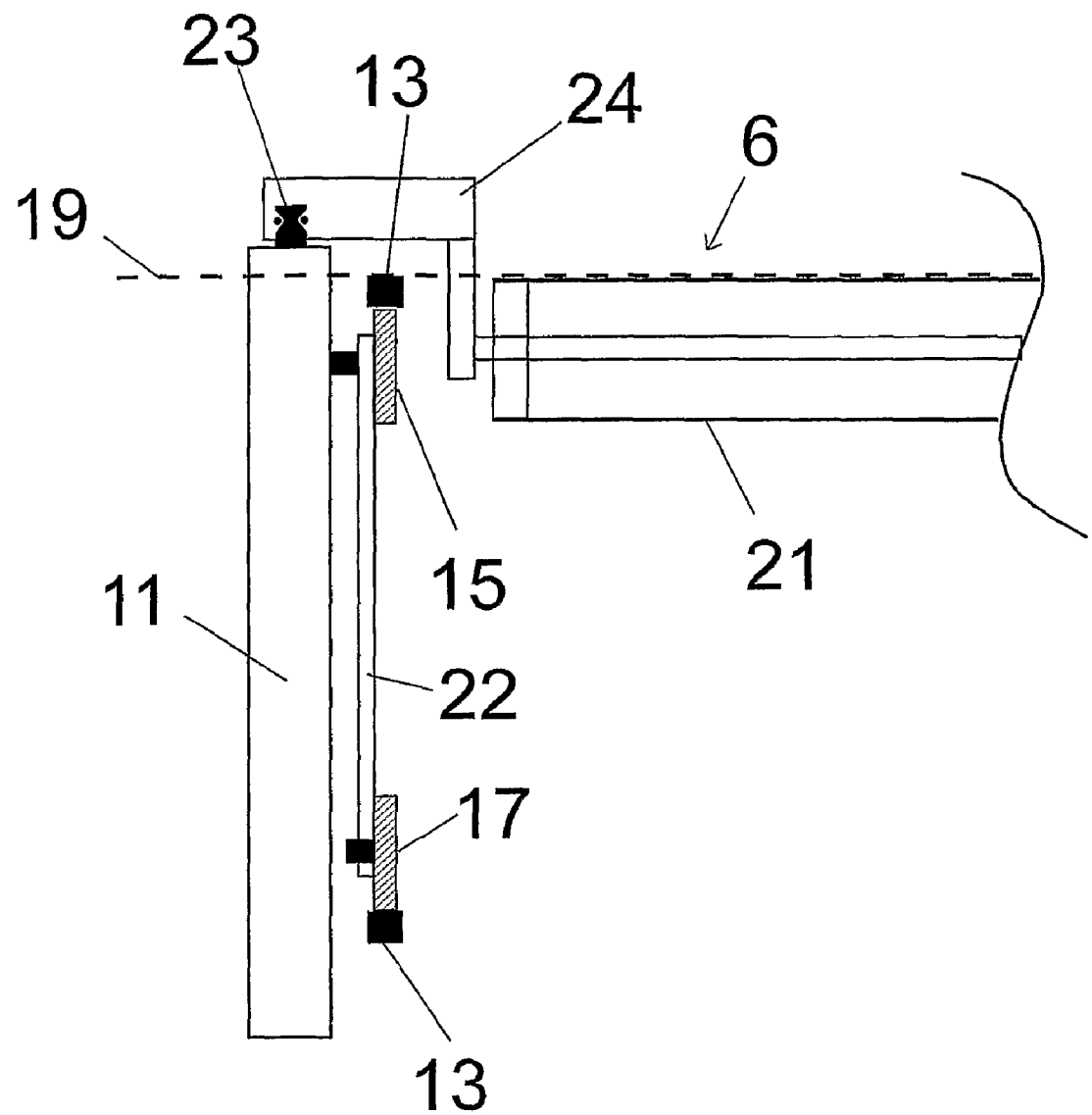
Figure 7:
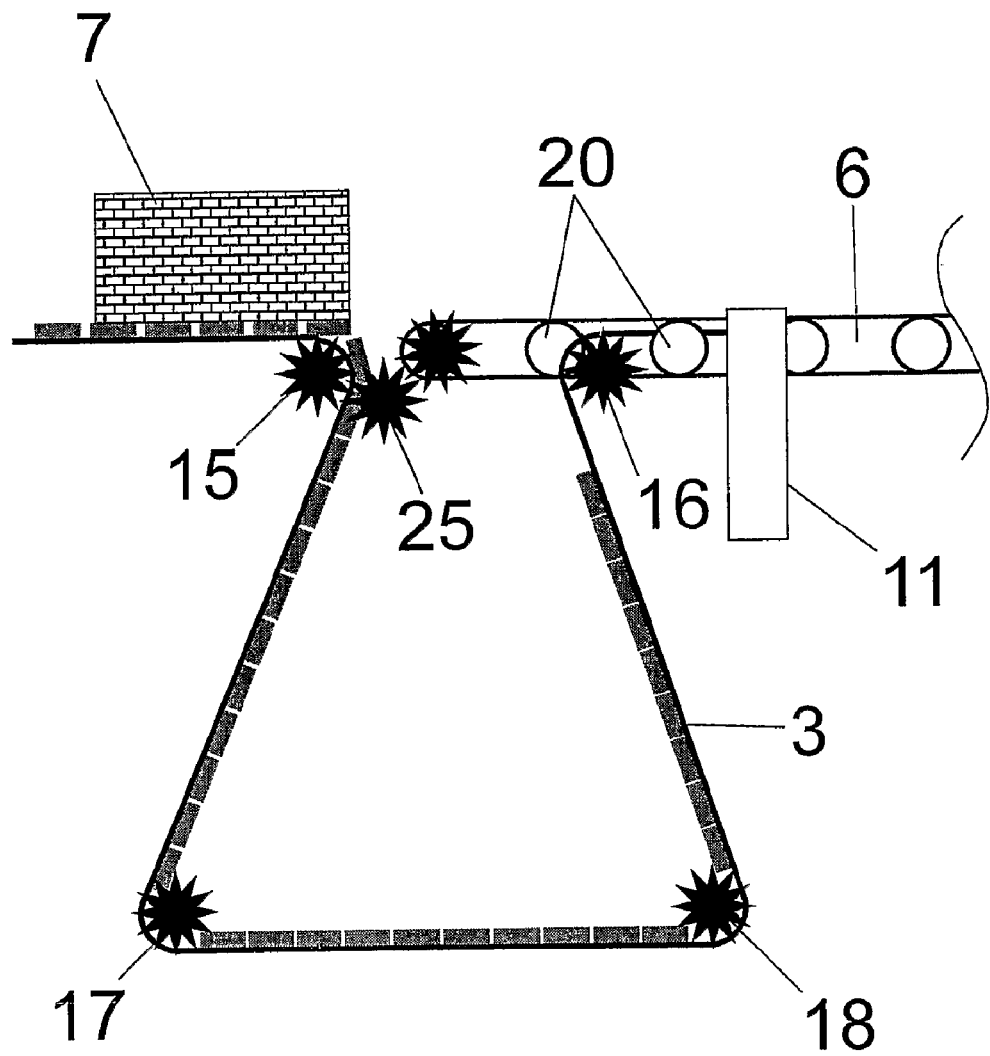

In the following the invention will be explained in further detail in conjunction with an embodiment example. In the drawing depict:

FIG. 1 a schematic diagram in top view of the supporting arrangement with the individual sequence steps, FIG. 2 a schematic sectional diagram of the essential elements of the arrangement corresponding to the sequence according to FIG. 1b, FIG. 3 a sectional diagram corresponding to FIG. 2 according to the sequence in FIG. 1c, FIG. 4 a sectional diagram corresponding to FIG. 2 according to the sequence in FIG. 1d, FIG. 5 a sectional diagram through the entire machine frame in the proximity of the first supporting table, FIG. 6 an enlarged diagram of one side of the machine frame in section with the guidance for the second supporting table, FIG. 7 an enlarged diagram of a segment of FIG. 2 with the schematic diagram of the coupling of the second supporting table to the first supporting table.

DETAILED DESCRIPTION

FIG. 1 shows in schematic basic diagram from above a supporting arrangement 1 comprising a machine frame in which bearing surfaces 2 and 3 are located. The two bearing surfaces 2 and 3 have a fixed end 9 and a movable end 10. The two bearing surfaces 2 and 3 form a first supporting table 4, the bearing surfaces 2 and 3 moving according to the direction of the arrow and therewith, with each end 9 fixed, the supporting tables alternately decreasing or increasing their size. Additionally, the supporting arrangement comprises furthermore a second supporting table 6. FIG. 1a shows the position of the bearing surfaces 2, 3 and of the work table 6 in the normal working state during the separation of a (not shown) workpiece. Such a supporting arrangement 1 is to be integrated into a separating device. This separating device is not shown in detail, but rather is only indicated symbolically by a separating unit 5. Like the bearing surfaces 2, 3, the separating unit 5, for example a laser or a water jet cutting device, is also movable in the direction of the arrow and, moreover, along a gap 8 between the two bearing surfaces 2, 3.

FIG. 1b shows the state in which the bearing surface 2 has its maximal size and carries a worked workpiece 7. The bearing surface 3 from FIG. 1a has descended down into the lower region of the machine frame 11 of the supporting arrangement 1, such that the second supporting table 6 is guided over the bearing surface 3 to the bearing surface 2 and is located in the supporting plane 19.

The supporting table 6, together with the movable end 10 of bearing surface 2, is subsequently moved in the direction of the fixed end 9 and therewith accepts the workpiece 7, as depicted in FIG. 1c.

In FIG. 1d the second supporting table 6 has completely accepted workpiece 7, while the bearing surface 2 has reached its end position. The second supporting table 6 now moves in the direction of the arrow out of the proximity of the first supporting table 4 again into its initial position, while the first supporting table 4 with its two bearing surfaces 2, 3 is again made ready for accepting the next workpiece. The entire sequence, as is obvious to a person of skill in the art, is controlled and regulated through appropriate process control devices.

FIG. 2 shows the state according to FIG. 1b in a schematic cross sectional illustration with a machine frame 11 indicated schematically, on which frame the two ends of a link belt 12 are fastened. The link belt 12 comprises two transport chains 13 on which stable bearing elements 14 are secured. On the link belt 12 are shown individual workpieces 7. The link belt 12 is guided in known manner over upper deflection rollers 15, 16 and lower deflection rollers 17, 18, the deflection rollers 15, 17 and 16, 18, respectively, being mechanically connected with one another and in the Figure are always moved jointly back and forth in the machine frame 11. As is further evident in the Figure, the transport chain 13 of the link belt 12 is longer than the bearing surfaces 2, 3 formed by the bearing elements 14. As a result, as shown in the Figure, the support surface 3, which normally is located to the right of the gap 8, has descended so far below the supporting plane 19 on the machine frame 11, that the second supporting table 6 can be moved into this plane 19. The second supporting table 6 comprises deflection rollers 20 and a turning endless belt 21 located above or below, such that during the movement of the second supporting table 6 into the proximity of the first supporting table 4 a crawler-like advance is generated.

The second supporting table 6 can be connected, for example, with its front deflection roller 20' and a (not shown) intermediate roller with the upper roller 15, such that the rotation of the upper roller 15 leads simultaneously to a rotation in the same direction of the front deflection roller 20. With the decrease of the bearing surface 2 according to FIG. 3 the second supporting table 6 is therewith moved beneath the workpieces 7 and can accept these without difficulties. The deflection rollers 16 and 18 remain in their position marginal to the machine frame 11.

FIG. 4 shows the supporting arrangement in the state in which the workpieces 7 have been completely accepted by the second supporting table 6. The rollers 15 and 17 have reached their end position such that the bearing surface 2 is also no longer available for the workpieces. The second supporting table 6 with the workpieces 7 can now, without further rotation of the deflection rollers 20, be moved out of the proximity of the first supporting table 4.

For exemplification, FIG. 5 shows the cross section through a supporting arrangement 1 with the machine frame 11, which supports the link belt 12 with bilateral transport chain 13 as well as the bearing elements 14. The machine frame 11, furthermore, supports and guides the upper rollers 15 and the lower rollers 17, connected via a system of rods 22, for the bearing surface 2. A sectional illustration with the bearing surface 3 would appear correspondingly.

FIG. 6 shows a segment enlargement of the guidance on the machine frame 11 with an additional guide rail 23, on which, across holding arms 24 the second supporting table 6 can be moved with the endless belt 21 along the machine frame 11.

In FIG. 7 a drive wheel 25 is shown schematically, which, after a mechanical (not shown) coupling of the second supporting table 6 to the first supporting table 4 ensures the appropriate rotational direction of the endless transport belt 21, which is thereby driven via the upper roller 15 of the bearing surface 2 of the first supporting table 4.

The invention claimed is:

1. An apparatus for positioning plate-shaped workpieces in a separating device having a separating unit, which, during a separating process, is movable in the X-/Y-directions, the X-advancement direction being rectilinear and the Y-advancement direction being transverse thereto, the apparatus comprising: a machine frame,
   a first supporting table with a first bearing surface and a second bearing surface, each bearing surface having a fixed end and a movable end, the two bearing surfaces being spaced apart from one another and forming a gap which is located at least beneath the separating unit of the separating device and which is variable by increasing the first bearing surface and decreasing the second bearing surface in the Y-direction,
   a link belt forming the bearing surfaces and comprising individual bearing elements having front ends which are supported on the machine frame, the link belt being secured at both ends on the machine frame and thereby respectively forming the fixed end of each bearing surface,
   guide devices for guiding the link belt with first guide devices forming the movable end of the respective bearing surface in order to form the gap and second guide devices beneath the bearing surfaces, and
   a second supporting table which is movable together with the first bearing surface in the Y-direction and which comprises an endless conveyor belt and guide rollers, the conveyor belt movable in a caterpillar-like manner on the guide rollers.

2. An apparatus as claimed in claim 1, wherein the link belt includes at least one transport chain which is secured at both ends on the machine frame, and which is longer than the bearing surfaces formed with the bearing elements, and wherein at least at one end, a supporting bearing surface protrudes so far that the non-supporting bearing elements on this end are located beneath the supporting plane on the machine frame when the gap has reached its lateral end position, and form an available space at least at the level of the second supporting table.

3. An apparatus as claimed in claim 2, wherein the second supporting table is movable into the proximity of the first supporting table when the non-supporting bearing elements of the bearing surface are located below the supporting plane on the machine frame.

4. An apparatus as claimed in claim 3, wherein the first guide devices of the supporting bearing surface are connectable with the guide rollers of the second supporting table.

5. An apparatus as claimed in claim 4, wherein the second supporting table is movable out of the proximity of the first supporting table after the workpiece has been completely positioned on the second supporting table, without turning the endless conveyor belt.

6. An apparatus as claimed in claim 3, wherein the second supporting table is guided laterally on the machine frame.

7. A method for separating and removing plate-shaped workpieces on a supporting apparatus, which workpieces are separated by means of a separating device having a separating unit, the supporting apparatus comprising a first bearing surface and a second bearing surface, which together form a first supporting table and which are spaced apart from one another and form a gap, which gap is located at least beneath the separating unit of the separating device and corresponds to the movement of the separating unit, which gap is variable by increasing one bearing surface and simultaneously reducing the other bearing surface,
   wherein the method comprises:
      moving the gap onto one end of the first supporting table, such that a first bearing surface supports the workpiece,
      moving a second supporting table with the first bearing surface to the other end of the first supporting table, thereby decreasing the first bearing surface and transferring the workpiece completely to the second supporting table, and subsequently
      moving the second supporting table with the workpiece thereon out of the proximity of the first supporting table.

8. A method as claimed in claim 7, wherein transferring the workpiece to the second supporting table is by means of an endless transport belt moving in a caterpillar-like manner, the endless transport belt being connected with the first supporting table and being driven thereby.

9. A method as claimed in claim 8, further comprising separating the second supporting table from the first supporting table after the workpiece has been transferred to the second supporting table and moving the second supporting table, without turning of the transport belt, out of the proximity of the first supporting table.

* * * * *